Patented June 13, 1933

1,914,338

UNITED STATES PATENT OFFICE

EDWARD D. CAMPBELL, OF INDIANAPOLIS, INDIANA, ASSIGNOR TO ELI LILLY AND COMPANY, OF INDIANAPOLIS, INDIANA, A CORPORATION OF INDIANA

LIVER EXTRACT

No Drawing.   Application filed October 20, 1928.   Serial No. 313,955.

It is the object of my invention to produce an effective extract of liver for use in the treatment of pernicious anemia, by oral administration.

It has been known that relief in cases of pernicious anemia could often be obtained by feeding liver to the patient. However, it was found that cooking the liver interfered with its beneficial effects; and many patients found it absolutely impossible to eat the great quantities of raw liver that were required to get such beneficial results. On account of this difficulty, a product of dried whole liver has heretofore been prepared, that was found to give beneficial results, although not as beneficial as desired; but even this dried whole-liver product had to be ingested in such large quantities that many patients rebelled.

Much of the liver substance which was ingested either in the raw or cooked liver or in the dried whole-liver product was inert, so far as concerned the relief of pernicious anemia; but it was administered because there was no known way of separating the potent material from the inert material of the liver, even if it were realized that there was such inert material present.

By my present invention, I obtain a potent extract of liver, having the greater part of the potency of the original liver in relieving pernicious anemia, but freed from the greater part of the inert material of the liver (inert as to its effect on pernicious anemia). By this means, I have been able to obtain a potent liver extract which has only a small fraction of the bulk of the original liver, which is not unpalatable, and which may effectively be administered orally in small doses; and yet which is found to be highly effective in the relief of pernicious anemia.

So far as I know, I am the first to produce such a liver extract, whether administerable orally or parenterally, for my product is effective either way, that has been capable of relieving pernicious anemia, and in doing so of causing a temporary large increase in the reticulated-cell count, and a subsequent permanent increase in the red-corpuscle count while the treatment continues and for some time afterward.

Probably this liver extract supplies a deficiency of something which the patient should derive from his own body, and which somehow controls the release of reticulated cells from the bone marrow into the blood.

In carrying out my invention, I may use liver from any animal, as from hogs or cattle. I mince or grind fine a quantity of liver, desirably from freshly slaughtered animals, although I may use liver which has been immediately refrigerated after removal from freshly slaughtered animals and kept refrigerated until used. I extract this liver, desirably several times, with a solvent which is capable of taking up that part of the liver which is effective for relieving pernicious anemia, for which purpose I find that water with sufficient alcohol added to coagulate the heavier proteins and permit the easy filtration is suitable. I desirably use a water-alcohol mixture for this solvent, of between 50% and 70% alcohol concentration, for facilitating subsequent filtrations; although I may use water alone. Both of these solvents contain much water, and either is thus included in the term "watery solvent". This alcohol-water extract, or water extract, is separated from the residue, as by decantation or filtration; and if there are several such extractions, the several water-alcohol or water extracts may be mixed. In the first extraction, the solvent may remain on the minced liver for only a relatively short time, say for an hour or so; but in subsequent extractions from the residue of the first extraction, the solvent is desirably allowed to remain on the material being extracted for a much longer time, usually overnight.

In making these extractions, I use a quantity of liquid which has several times the volume of the liver being extracted.

After the filtrates from the extraction are combined, the volume is desirably reduced. This evaporates all or substantially all of the alcohol, if alcohol was used. The potent material remains in solution.

To this solution, which is now practically a water solution even if alcohol was used in the extraction, I add about 25 volumes of 95% alcohol; which gives about 91% alcohol concentration. This causes a precipitation of certain materials that were in solution, but leaves some of the potent material still in solution, although most of it is carried down with the precipitate. The mixture is allowed to stand overnight, to allow precipitation to become substantially complete and then is filtered. The filtrate thus obtained may be reduced to dryness, and the dry material thus obtained pulverized and held as part C; although the activity in this part C is relatively so small that usually this filtrate is not preserved.

The residue or separated precipitate from the last-named filtration is dried, and held as part B; and contains most of the activity.

The original gland residue obtained from the filtration or decantation following the first and second extractions may be held as part A, but is usually discarded as it contains almost no activity. If the solvent was the alcohol-water mixture, the residue contains the fraction which is insoluble in 50–70% alcohol concentration; which fraction is relatively inert in the treatment of pernicious anemia, and need not be retained in the fraction to be used for that treatment.

It is found that the fraction B, which is the part that was soluble in 50% to 70% alcohol concentration but insoluble in 90% to 92% alcohol concentration, is most effective in the treatment of pernicious anemia; although there is some activity in each of fractions A and C.

The fraction B is usually less than 1/10th, and usually only approximately 1/25th, by weight, of the original liver; but it is found that it contains the greater part of the potency for relieving pernicious anemia that was contained in the original liver. Thus, weight for weight, it has a pernicious-anemia potency which is at least five times that of original liver, is usually twelve or fifteen times that of original liver, and sometimes is even higher than that. In consequence, instead of a daily dose of 200 to 300 grams of original liver, such as is usually required to produce effective remission in pernicious-anemia cases, I am able to obtain equivalent effects by the daily administration of not to exceed 30 to 45 grams, and usually by the daily administration of not to exceed 12 to 18 grams; and sometimes with even smaller doses than that.

This fraction B, largely by reason of its small bulk, can be administered orally with ease, as compared with raw or dried whole liver. A convenient way of administering it is in orange juice. It is found to be most effective in the relief of clinical cases of pernicious anemia, usually to increase the reticulated-cell count in the blood for several days after the treatment with it is begun; to produce a gradual increase in the red-corpuscle count, until it reaches a substantially normal value after a few weeks; to arrest symptoms of disintegration and degeneration, and to relieve to some extent difficulty in locomotion, and to prevent almost wholly the increase in such difficulty that would otherwise occur in the natural course of the disease; and to produce a general feeling of new life in the patient.

In addition to being indicated in cases of pernicious anemia, it is found that my extract is also efficacious on oral administration in various other run-down conditions, and that it has a general tonic effect.

The following is an example of an extraction in accordance with my invention:

18 pounds of hog liver were finely minced, and suspended in enough water and alcohol to give a 50–70% alcohol concentration of the extracting medium, with a volume of about 14½ litres of solvent. This requires less added water than at first seems apparent, because of water from the liver; so that, for example, 2,450 c.c. of water and 12,000 c.c. of 95% alcohol is used. The alcohol used may be either ethyl alcohol or methyl alcohol, or a mixture; and the alcohol known as No. 30 alcohol, which is a special denatured alcohol authorized by the Government, is found to be very effective. Other alcohols may be used. This is allowed to stand for an hour or two, and filtered.

The residue from this filtration was suspended in a water-alcohol solution, of about 70% alcohol concentration, and allowed to stand overnight. For this second extraction, 9,864 c.c. of alcohol and 4,716 c.c. of water were used. After standing overnight, the mixture was filtered, to separate the residue from the solution.

This residue is fraction A, and may be discarded.

There may be further extractions of this residue, if desired; but two are usually found to be sufficient.

The two filtrates, obtained from the first and second extractions, were combined, and the volume reduced to approximately one litre, as by vacuum evaporation, in order to remove practically all the alcohol. Then 25 litres of 95% alcohol were added; which made a resultant alcohol concentration of about 91%. This caused the precipitation of certain of the heavier molecules in solution; and these were separated out by filtration. This precipitate, after being dried, constitutes fraction B; and is the fraction which is found to be most efficacious, and to contain the greater part of the activity of the original liver, although only constituting about 1/25th by weight of the original liver. The remaining filtrate may be evaporated to dryness, and the dry material thus obtained pulverized, to constitute fraction C; which has some potency.

Fractions B and C may be mixed and administered together; but I prefer fraction B alone.

I claim as my invention:—

1. The method of producing from liver a concentrated substance capable of producing beneficial effects in the treatment of pernicious anemia, which consists in treating liver with an extractive agent of the class comprising water and a water-alcohol mixture up to 70% alcohol concentration to take up most of the material which is potent in such treatment but to leave behind the greater part of the original gland, separating the extract thus obtained from the solid residue, and treating such extract with alcohol to separate from said potent material at least part of the matter which was dissolved with it in the extraction.

2. The method of producing from liver a concentrated substance capable of producing beneficial effects in the treatment of pernicious anemia, which consists in extracting liver with an alcohol-water mixture of about 50% to 70% alcohol concentration, separating the extract from the solid residue, removing the alcohol from the extraction to make the solution a water solution, adding alcohol to produce an alcohol concentration of about 90% to 92%, filtering to separate the resultant precipitate, and preserving such precipitate for administration.

3. An extract derived from the liver of animals, comprising a product effective in relieving the symptoms of pernicious anemia, having the greater part of the potency of the original liver for that purpose, and when in dry form having a weight of the order of 1/25th of the original liver from which it is derived.

4. A product derived from the liver of animals, and effective in relieving the symptoms of pernicious anemia and containing the greater part of the original potent material of the liver for that purpose but when in dry form being less than 1/10th of the weight of the original liver; which substance upon repeated oral administration is capable of producing an increase in the red-corpuscle count that makes that count approach normal and remain there over an extended period during the continuation of such repeated oral administration.

5. A product derived from the liver of animals, comprising a fraction which is soluble in alcohol of 50–70% alcohol concentration, and which is effective in relieving the symptoms of pernicious anemia with a potency of over half that of the original liver, but which when in dry form has a weight of less than one-tenth of the weight of the original liver.

6. The method of producing from liver a concentrated substance capacle of producing beneficial effects in the treatment of pernicious anemia, which consists in extracting liver with an extractive agent of the class comprising water and a water-alcohol mixture up to 70% alcohol concentration and treating the extract with alcohol to obtain a product which contains the liver fraction which is soluble in alcohol of 50–70% alcohol concentration and which is effective in relieving the symptoms of pernicious anemia with a potency of over half that of the original liver but which extract when in dry form has a weight of less than one-tenth ($\frac{1}{10}$) of the weight of the original liver.

7. The method of producing from liver a concentrated substance capable of producing beneficial effects in the treatment of pernicious anemia, which consists in extracting liver with an alcohol-water mixture of about 50% to 70% alcohol concentration, separating the extract from the solid residue, removing the alcohol from the extract to make the solution a water solution, and concentrating to produce a material which is effective in relieving the symptoms of pernicious anemia with a potency of over half that of the original liver but with a weight when in dry form of less than one-tenth ($\frac{1}{10}$) of the weight of the original liver.

8. The method of producing from liver a concentrated substance capable of producing beneficial effects in the treatment of pernicious anemia, which consists in extracting liver with water, and treating the extract with alcohol to obtain therefrom a solid product which contains the fraction which is soluble in alcohol of 50–70% alcohol concentration but insoluble in alcohol of 90–92% alcohol concentration.

9. A liver extract effective in relieving the symptoms of pernicious anemia with a potency of over half that of the original liver from which the extract is derived, and including a fraction which is soluble in alcohol of 50–70% alcohol concentration and insoluble in 90–92% alcohol concentration.

10. A product derived from the liver of animals, and comprising a fraction which is soluble in alcohol of 50% to 70% alcohol concentration, which product is effective in relieving symptoms of pernicious anemia and when in dry form has a weight of less than one tenth of the weight of the original liver.

11. A liver extract which contains a liver fraction soluble in 50% to 70% alcohol and which in daily doses of not to exceed 30 grams produces an effect in relieving symptoms of pernicious anemia that is as great as that produced by daily doses of 200 grams of original liver.

In witness whereof, I have hereunto set my hand at Indianapolis, Indiana, this 3d day of October, A. D. one thousand nine hundred and twenty-eight.

EDWARD D. CAMPBELL.